United States Patent
Fung et al.

(10) Patent No.: US 7,033,971 B2
(45) Date of Patent: Apr. 25, 2006

(54) METHOD FOR USING STABILIZING CATALYST ACTIVITY DURING MTO UNIT OPERATION

(75) Inventors: Shun C. Fung, Bridgewater, NJ (US); Richard B. Hall, Whitehouse Station, NJ (US); Hafedh Kochkar, Phillipsburg, NJ (US); Karl G. Strohmaier, Port Murray, NJ (US); Nicolas P. Coute, Houston, TX (US); Kenneth R. Clem, Humble, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 10/774,859

(22) Filed: Feb. 9, 2004

(65) Prior Publication Data

US 2005/0176579 A1 Aug. 11, 2005

(51) Int. Cl.
*B01J 27/182* (2006.01)
*B01J 21/20* (2006.01)

(52) U.S. Cl. .......................... 502/214; 502/20; 502/208

(58) Field of Classification Search ................ 502/208, 502/214, 20
See application file for complete search history.

(56) References Cited

U.S. PATENT DOCUMENTS

| | | | |
|---|---|---|---|
| 4,397,816 A | 8/1983 | Luckenbach | 422/144 |
| 4,677,242 A | 6/1987 | Kaiser | 585/638 |
| 4,681,864 A | 7/1987 | Edwards et al. | 502/63 |
| 5,157,181 A | 10/1992 | Stine et al. | 585/329 |
| 6,005,155 A | 12/1999 | Sun | 585/640 |
| 6,023,005 A * | 2/2000 | Lattner et al. | 585/639 |
| 6,166,282 A | 12/2000 | Miller | 585/638 |
| 6,316,683 B1 | 11/2001 | Janssen et al. | 585/640 |
| 6,437,208 B1 | 8/2002 | Kuechler et al. | 585/640 |
| 6,455,748 B1 * | 9/2002 | Janssen et al. | 585/638 |
| 6,482,999 B1 * | 11/2002 | Fung et al. | 585/640 |
| 6,503,863 B1 * | 1/2003 | Fung et al. | 502/214 |
| 6,620,983 B1 * | 9/2003 | Cao et al. | 585/640 |
| 6,793,901 B1 * | 9/2004 | Cao et al. | 423/305 |
| 6,797,852 B1 * | 9/2004 | Janssen et al. | 585/640 |
| 2002/0013505 A1 * | 1/2002 | Fung et al. | 585/640 |
| 2002/0169067 A1 * | 11/2002 | Janssen et al. | 502/20 |
| 2003/0231999 A1 * | 12/2003 | Cao et al. | 423/305 |
| 2005/0125598 A1 | 6/2005 | Gilfix et al. | 711/108 |

* cited by examiner

*Primary Examiner*—Elizabeth D. Wood (57) ABSTRACT

A method for maintaining the activity of silicoaluminophosphate (SAPO) molecular sieve catalyst particles during oxygenate to olefin conversion reactions. After regeneration of SAPO catalyst particles, the regenerated particles are mixed with particles having coke on their surface in a manner that maintains their catalytic activity at a predetermined level.

33 Claims, 2 Drawing Sheets

■ = Catalyst 1

Δ = Catalyst 2

♦ = Catalyst 3

METHOD FOR USING STABILIZING CATALYST ACTIVITY DURING MTO UNIT OPERATION

FIELD OF THE INVENTION

This invention relates to methods for preserving the activity of molecular sieve catalysts used during oxygenate-to-olefin conversion processes. In particular, this invention relates to methods for preserving the activity of silicoaluminophosphate molecular sieve catalysts.

BACKGROUND OF THE INVENTION

Methanol is used as a feed stock for a variety of chemical manufacturing processes. One process that is more recently being developed is the conversion of methanol to olefin products, particularly products containing the olefins ethylene and propylene. The olefins produced from the methanol conversion process are of suitable quality to be used in polymer manufacturing processes. Of particular commercial concern in the methanol conversion process, however, is whether sufficient quantities of prime olefins (i.e., ethylene and propylene) can be produced.

U.S. Pat. No. 4,677,242 (Kaiser) describes the use of a silicoaluminophosphate (SAPO) molecular sieve catalyst for converting various oxygenates, such as methanol, to olefins. According to the patent, the SAPO catalyst is an extremely efficient catalyst for the conversion of oxygenates to prime olefin products when the feed is converted in the presence of a diluent. The diluent used has an average kinetic diameter larger than the pores of the SAPO molecular sieve. The selected SAPO molecular sieves have pores that an average kinetic diameter characterized such that the adsorption capacity (as measured by the standard McBain-Bakr gravimetric adsorption method using given adsorbate molecules) shows adsorption of oxygen (average kinetic diameter of about 3.36 angstroms) and negligible adsorption of isobutane (average kinetic diameter of about 5.0 angstroms).

U.S. Pat. No. 6,316,683 (Janssen et al.) describes a method for making an olefin product from an oxygenate feedstock while protecting the catalytic activity of a silicoaluminophosphate molecular sieve used for catalyzing the reaction. Prior to use, the molecular sieve is protected by shielding with a template molecule or by carbonaceous material on the surface of the molecular sieve material. After removing the template or carbonaceous material to activate the molecular sieve, catalytic activity is protected by maintaining the temperature of the molecular sieve above 150° C. Alternatively, the activated catalyst can be exposed to temperatures below 150° C. by preventing exposure of catalyst active sites to water.

U.S. Pat. No. 6,166,282 (Miller) describes a method for making an olefin product from an oxygenate feedstock. The oxygenate feedstock is exposed to a catalyst bed that facilitates the reaction. During the reaction, a carbonaceous product builds up on the catalyst particles. The catalyst particles are passed through a regenerator to remove the carbonaceous product.

What is desired are methods that allow for more efficient conversion of oxygenates to olefins. In particular, methods are desired that allow for protection of catalyst used in such conversions during periods of extended use.

SUMMARY OF THE INVENTION

This invention provides methods of converting oxygenates to olefins at increased efficiency. In particular, the invention provides for methods of protecting the catalytic activity of catalyst so that the life of the catalyst is not unduly shortened.

In one embodiment, a process for protecting catalytic activity of a silicoaluminophosphate molecular sieve is provided. The process comprises regenerating catalyst particles that contain the silicoaluminophosphate molecular sieve, followed by mixing the regenerated catalyst particles with coked catalyst particles to maintain the catalytic activity of the mixed catalyst particles at a predetermined level.

In an embodiment, the regenerated catalyst particles are mixed with coked catalyst particles at a temperature of less than 550° C., more desirably from about 400° C. to about 550° C. The regenerated catalyst particles have an average coke level of less than 1% by weight relative to the weight of molecular sieve in the catalyst particles, preferably less than 0.2%.

In an embodiment, the coked catalyst particles have an average coke level of at least 2% coke by weight relative to the weight of molecular sieve in the catalyst particles. In another embodiment, the coked catalyst particles have an average coke level of at least 7% coke. In an embodiment, the coked catalyst particles have an average coke level not greater than 18%. In another embodiment, the coked catalyst particles have an average coke level not greater than 13%. In still another embodiment, the coked catalyst particles have an average coke level that is defined by a lower limit and an upper limit selected from the values above. Preferably, the mass flow rate of the regenerated particles at mixing is at least 5% of the mass flow rate of the coked catalyst particles, and more preferably it is from about 20% to 100% of the mass flow rate of the coked catalyst particles.

To achieve a desired mixing temperature, the process can further comprise cooling the regenerated catalyst particles prior to mixing with the coked catalyst particles. For example, the regenerated catalyst particles can be cooled by contacting the regenerated particles with steam.

In another embodiment, the regenerated catalyst particles can be mixed with the coked catalyst particles in an atmosphere containing an oxygen-containing gas, such as molecular oxygen or steam. Preferably, the atmosphere contains at least 1 mole percent of the oxygen-containing gas, and more preferably contains from about 5 mole percent to about 20 mole percent of the oxygen containing gas.

In an embodiment, the regenerated catalyst particles are regenerated in a regenerator that is part of a reactor system for converting hydrocarbons to olefins. In such a reactor system, the regenerated catalyst particles can be mixed with coked catalyst particles in a fluidized bed within a reactor. Alternatively, the regenerated catalyst particles can be mixed with coked catalyst particles prior to introducing the regenerated catalyst particles into a fluidized bed within a reactor.

Preferably, the catalyst particles passing through the regenerator are exposed to a stoichiometric excess of oxygen relative to the amount of oxygen needed to react with all of the coke contained in the catalyst particles. Exposing the catalyst particles to an excess of oxygen will result in a flue gas containing at least 0.2 mole percent of oxygen relative to the total amount of flue gas, and more preferably containing 1 mole percent of oxygen.

Preferably, this invention maintains the activity of the mixed catalyst particles at above 80% conversion of methanol to olefin at a Cumulative grams of Methanol Converted Per gram of Sieve (CMCPS) value of 5. More preferably, the activity of the mixed catalyst particles is maintained at above 90% conversion of methanol to olefin at a CMCPS value of 5. Alternatively, this invention maintains the activity of the mixed catalyst particles at above 80% conversion, preferably above 90% conversion, at a CMCPS value corresponding to half of the catalyst lifetime. For catalyst particles having a maximum CMCPS value between about 20 to 30, the conversion rate is maintained at greater than 80% conversion, and preferably greater than 90% conversion, at a CMCPS value between about 10 to 15. For catalyst particles having a maximum CMCPS value from about 40 to about 50, the conversion rate is maintained at greater than 80% conversion, and preferably greater than 90% conversion, at a CMCPS value from about 20 to about 25.

In an embodiment, this invention maintains the selectivity of the mixed catalyst particles at above an average prime olefin selectivity value of 72.0%. Preferably, the selectivity of the mixed catalyst particles is maintained within 1% of an average prime olefin selectivity value for a sample of catalyst particles that does not contain deactivated catalyst.

In another embodiment, this invention provides a process for protecting catalytic activity of a silicoaluminophosphate molecular sieve, comprising regenerating catalyst particles that contain the silicoaluminophosphate molecular sieve; cooling the regenerated catalyst particles prior to mixing; and mixing the regenerated catalyst particles with additional catalyst particles having a coking level of at least 2% by weight at said mixing temperature that maintains the catalytic activity of the additional catalyst particles at above 80% conversion of methanol at half of the maximum CMCPS value. In an embodiment where the maximum CMCPS value is between 10 and 15, the activity of the catalyst particles is maintained at above 80% conversion of methanol at a CMCPS value of 5.

In still another embodiment, the invention provides a method for forming polyolefins from an oxygenate feedstock. The method comprises converting an oxygenate feedstock into olefins by exposing the oxygenate to a silicoaluminophosphate molecular sieve catalyst; regenerating the silicoaluminophosphate molecular sieve catalyst; mixing the regenerated catalyst particles with coked catalyst particles to maintain the catalytic activity of the mixed catalyst particles at a predetermined level; and forming polyolefins from the converted olefins.

DETAILED DESCRIPTION OF THE EMBODIMENTS

I. Protecting Catalytic Activity of a Silicoaluminophosphate Molecular Sieve

This invention is directed to methods for protecting silicoaluminophosphate molecular sieve particles. This is achieved by preventing exposure of coked catalyst particles to temperatures higher than conventional temperatures for the oxygenate to olefin reaction when there is no source of gas phase oxygen. In an embodiment, catalyst particles that contain silicoaluminophosphate molecular sieve are regenerated. The regenerated catalyst particles are then mixed with other catalyst particles that contain carbonaceous material (i.e., coke). The regenerated catalyst particles and coked catalyst particles are mixed together in a manner that maintains the catalytic activity of the mixed catalyst particles at a predetermined level.

Conventional process temperatures for oxygenate to olefin reactions can be used in this invention. In one embodiment, the oxygenate to olefin reactions are carried out at a temperature of from 400° C. to 550° C., preferably from 430° C. to 520° C. By contrast, the temperature for a regeneration process can be 100° C. or more above the process temperature for an oxygenate to olefin reaction. As a result, regenerated catalyst particles are at an elevated temperature after regeneration, but do not contain significant levels of coke on the surface. The amount of coke on a catalyst particle after regeneration is, in one embodiment, less than 2% by weight relative to the weight of molecular sieve material in the catalyst particle. Preferably, the amount of coke is on a catalyst particle after regeneration is less than 1% by weight, more preferably less than 0.5% by weight, and most preferably less than 0.2% by weight.

The amount of coke on non-regenerated catalyst particles, or coked catalyst particles, is in one embodiment from 2% to up to 20% or more coke by weight relative to the weight of molecular sieve material in the catalyst particles. Preferably, the amount of coke on the coked catalyst is less than 18% by weight relative to the weight of molecular sieve material in the catalyst particles, more preferably less than 16%, and most preferably less than 13%. In another embodiment, the non-regenerated particles contain from about 7% to 13% coke by weight. In still another embodiment, the amount of coke on the catalyst particles is between a lower weight percent and an upper weight percent selected from the values above.

In one embodiment, catalyst particles that are regenerated are exposed to an excess of oxygen during regeneration. Preferably, when catalyst particles are exposed to an excess of oxygen during regeneration, the regeneration flue gas that exits the regenerator contains at least 0.2 mole percent oxygen relative to the total volume of flue gas. More preferably, the excess of oxygen during regeneration results in regeneration flue gas containing at least 1 mole percent oxygen.

After regeneration, the regenerated catalyst particles are eventually mixed with coked catalyst particles in the reactor. In order to maintain a desired coke level on the particles, a reactor system can be configured to regenerate only a portion of the catalyst particles as the particles circulate through the reactor. The regenerated catalyst particles are then mixed together with the non-regenerated, coked catalyst particles. This mixing can take place in the fluidized bed of catalyst particles, or the flow of regenerated particles can be added to a flow of coked catalyst particles prior to entering the fluidized bed. The relative amounts of regenerated and coked particles that are mixed together is based in part on the amount of regeneration occurring in the reactor system. The total mass flow of particles within the system can be a conventional amount suitable for performing an oxygenate to olefin reaction. After leaving the oxygenate to olefin reactor, the total mass flow is split into a flow that will enter the regenerator and a flow that will bypass the regenerator. The flow that does not enter the regenerator is referred to here as the flow of coked catalyst particles. The mass or amount of regenerated particles in the regenerated particle flow is selected to maintain a desired average coking level within the reactor system. In one embodiment, the mass flow rate of regenerated catalyst particles during mixing will be at least 5% of the mass flow rate of the coked catalyst particles, preferably at least 10%, more preferably at least 20%, and most preferably at least 30%. In another embodiment, the mass flow rate of regenerated catalyst particles will be less than 200% of the mass flow rate of the coked catalyst particles, preferably less than 100%, more preferably less than 75%, and most preferably less than 50%.

If the regenerated catalyst particles are still at an elevated temperature when mixed with coked catalyst particles, the catalytic activity of the coked particles can be degraded. This degradation will result, for example, in a lower conversion percentage for oxygenate feedstock in the reactor system. In an embodiment, the degradation of catalytic activity is significantly reduced or avoided by cooling the regenerated particles prior to mixing with the coked catalyst. This can be done, for example, using a conventional heat transfer device such as a catalyst cooler or by adding steam at a temperature below the riser reactor temperature to the regenerated catalyst as it leaves the regenerator. Adding steam also provides a source of oxygen in the event that the regenerated catalyst particles are not sufficiently cooled prior to contacting the coked particles.

Alternatively, the degradation of catalytic activity is reduced or eliminated if the catalyst particles are mixed in the presence of a gas phase oxygen source, such as air or $H_2O$. $H_2O$, particularly in the form of steam, is a preferred gas phase oxygen source. Air or other compounds containing $O_2$ can also be used, but at temperatures above 550° C. available $O_2$ will cause removal of coke from the surface of a catalyst particle, as in a regeneration process.

According to one embodiment, the regenerated catalyst particles are mixed with coked catalyst particles in an atmosphere containing at least 0.5 mole percent of an oxygen-containing gas, preferably at least 1 mole percent, more preferably at least 2 mole percent, and most preferably at least 5 mole percent. The regenerated catalyst particles are preferably mixed with coked catalyst particles in an atmosphere containing up to 100 mole percent of an oxygen containing gas, preferably less than 30 mole percent, more preferably less than 20 mole percent, and most preferably less than 15 mole percent.

One method of measuring the degradation of catalyst particles is to determine the Cumulative grams of Methanol Converted Per gram of Sieve (CMCPS) for a sample of catalyst particles. A CMCPS plot shows the percentage of methanol that is converted into olefin as a function of how much methanol has been added to the reactor. A degraded catalyst particle sample will show a drop off in methanol conversion percentage much earlier than a sample of catalyst particles that has been protected using the processes of this invention. For example, the CMCPS value at which non-deactivated catalyst particles convert only 50% of available methanol can be used as a definition of lifetime for the catalyst particle. Use of this invention allows the activity of catalyst particles to be maintained at greater than 80% conversion at half of the catalyst lifetime for that catalyst particle, and preferably greater than 90% conversion at half of the catalyst lifetime.

II. Molecular Sieve Material

A. Composition of Molecular Sieve Catalyst

The molecular sieves used in the present invention are preferably silicoaluminophosphate (SAPO) molecular sieves or metal substituted SAPO molecular sieves. In an embodiment, the metal is an alkali metal of Group IA of the Periodic Table of Elements, an alkaline earth metal of Group IIA of the Periodic Table of Elements, a rare earth metal of Group IIIB, including the Lanthanides: lanthanum, cerium, praseodymium, neodymium, samarium, europium, gadolinium, terbium, dysprosium, holmium, erbium, thulium, ytterbium and lutetium; and scandium or yttrium of the Periodic Table of Elements, a transition metal of Groups IVB, VB, VIB, VIIB, VIIIB, and IB of the Periodic Table of Elements, or mixtures of any of these metal species. In one preferred embodiment, the metal is selected from the group consisting of Co, Cr, Cu, Fe, Ga, Ge, Mg, Mn, Ni, Sn, Ti, Zn and Zr, and mixtures thereof. In another preferred embodiment, these metal atoms discussed above are inserted into the framework of a molecular sieve through a tetrahedral unit, such as [$MeO_2$], and carry a net charge depending on the valence state of the metal substituent. For example, in one embodiment, when the metal substituent has a valence state of +2, +3, +4, +5, or +6, the net charge of the tetrahedral unit is between −2 and +2.

In one embodiment, the silicoaluminophosphate molecular sieve is represented, on an anhydrous basis, by the formula:

$$mR:(Si_xAl_yP_z)O_2$$

wherein R represents at least one templating agent, preferably an organic templating agent; m is the number of moles of R per mole of ($Si_xAl_yP_z$)$O_2$ and m has a value from 0 to 1, preferably 0 to 0.5, and most preferably from 0 to 0.3; x, y, and z represent the mole fraction of Al, P and Si as tetrahedral oxides. In an embodiment, m is greater than or equal to 0.2, and x, y and z are greater than or equal to 0.01. In another embodiment, m is greater than 0.1 to about 1, x is greater than 0 to about 0.25, y is in the range of from 0.4 to 0.5, and z is in the range of from 0.25 to 0.5, more preferably m is from 0.15 to 0.7, x is from 0.01 to 0.2, y is from 0.4 to 0.5, and z is from 0.3 to 0.5.

In one embodiment, the silicoaluminophosphate molecular sieves have an Si/Al ratio of not greater than about 0.5, preferably not greater than about 0.3, more preferably not greater than about 0.2, still more preferably not greater than about 0.15, and most preferably not greater than about 0.1. In another embodiment, the Si/Al ratio is sufficiently high to allow for increased catalytic activity of the molecular sieve. Preferably, the silicoaluminophosphate molecular sieves contain Si and Al at a ratio of at least about 0.005, more preferably at least about 0.01, and most preferably at least about 0.02.

Non-limiting examples of SAPO molecular sieves useful herein include one or a combination of SAPO-5, SAPO-8, SAPO-11, SAPO-16, SAPO-17, SAPO-18, SAPO-20, SAPO-31, SAPO-34, SAPO-35, SAPO-36, SAPO-37, SAPO-40, SAPO-41, SAPO-42, SAPO-44, SAPO-47, SAPO-56, and metal containing molecular sieves thereof. Of these, particularly useful molecular sieves are one or a combination of SAPO-18, SAPO-34, SAPO-35, SAPO-44, SAPO-56, AlPO-18, AlPO-34 and metal containing derivatives thereof, such as one or a combination of SAPO-18, SAPO-34, AlPO-34, AlPO-18, and metal containing derivatives thereof, and especially one or a combination of SAPO-34, AlPO-18, and metal containing derivatives thereof.

In an embodiment, the molecular sieve is an intergrowth material having two or more distinct crystalline phases within one molecular sieve composition. In particular, intergrowth molecular sieves are described in U.S. Patent Application Publication No. 2002-0165089 and International Publication No. WO 98/15496, published Apr. 16, 1998, both of which are herein fully incorporated by reference. For example, SAPO-18, has an AEI framework-type, and SAPO-34 has a CHA framework-type. Thus, the molecular sieve used herein may comprise at least one intergrowth phase of AEI and CHA framework-types, especially where the ratio of CHA framework-type to AEI framework-type, as determined by the DIFFaX method disclosed in U.S. Patent Application Publication No. 2002-0165089, is greater than 1:1.

B. Formulation of Molecular Sieve Catalyst

The SAPO molecular sieves used in this invention are preferably crystalline. However, these SAPO molecular seives are typically used as formulated catalyst particles rather than as pure crystals. Providing the SAPO catalyst as a formulated catalyst particle allows for greater control over the oxygenate to olefin conversion process. For example, the composition of the formulated catalyst particle can be optimized to give a desired reactivity for a desired particle size. This invention focuses on maintaining the catalytic activity of such formulated catalyst particles.

In general, the formulated molecular sieve catalyst of this invention optionally contains binder and matrix materials. The formulated catalyst is made by mixing together molecular sieve crystals (which includes template) and a liquid, optionally with matrix material and/or binder, to form a slurry. The slurry is then dried (i.e., liquid is removed), without completely removing the template from the molecular sieve. Since this dried molecular sieve catalyst includes template, it has not been activated, and is considered a preformed catalyst. The catalyst in this form is resistant to catalytic loss by contact with moisture or water. However, the preformed catalyst must be activated before use, and this invention provides appropriate methods to protect the activated catalyst from significant deactivation.

The liquid used to form the slurry can be any liquid conventionally used in formulating molecular sieve catalysts. Non-limiting examples of suitable liquids include water, alcohol, ketones, aldehydes, esters, or a combination thereof. Water is a preferred liquid.

Matrix materials are optionally included in the slurry used to make the formulated molecular sieve catalyst of this invention. Such materials are typically effective as thermal sinks assisting in shielding heat from the catalyst composition, for example, during regeneration. They can further act to densify the catalyst composition, increase catalyst strength such as crush strength and attrition resistance, and to control the rate of conversion in a particular process. Non-limiting examples of matrix materials include one or more of: rare earth metals, metal oxides including titania, zirconia, magnesia, thoria, beryllia, quartz, silica or sols, and mixtures thereof, for example, silica-magnesia, silica-zirconia, silica-titania, silica-alumina and silica-alumina-thoria.

In one embodiment, matrix materials are natural clays, such as those from the families of montmorillonite and kaolin. These natural clays include kaolins known as, for example, Dixie, McNamee, Georgia and Florida clays. Non-limiting examples of other matrix materials include: halloysite, kaolinite, dickite, nacrite, or anauxite. Optionally, the matrix material, preferably any of the clays, are calcined, acid treated, and/or chemical treated before being used as a slurry component. Under the optional calcination treatment, the matrix material will still be considered virgin material as long as the material has not been previously used in a catalyst formulation.

In a particular embodiment, the matrix material is a clay or a clay-type composition, preferably a clay or clay-type composition having a low iron or titania content, and most preferably the matrix material is kaolin. Kaolin has been found to form a pumpable, high solid content slurry; it has a low fresh surface area, and it packs together easily due to its platelet structure.

Preferably, the matrix material, particularly clay, and preferably kaolin, has an average particle size of from about 0.05 μm to about 0.75 μm; more preferably from about 0.1 μm to about 0.6 μm. It is also desirable that the matrix material have a d90 particle size distribution of less than about 1.5 μm, preferably less than about 1 μm.

Binders are also optionally included in the slurry used to make the formulated molecular sieve catalysts of this invention. Such materials act like glue, binding together the molecular sieve crystals and other materials, to form a formulated catalyst composition. Non-limiting examples of binders include various types of inorganic oxide sols such as hydrated aluminas, silicas, and/or other inorganic oxide sols. In one embodiment of the invention, the binder is an alumina-containing sol, preferably aluminium chlorohydrate. Upon calcining, the inorganic oxide sol, is converted into an inorganic oxide matrix component, which is particularly effective in forming a hardened molecular sieve catalyst composition. For example, an alumina sol will convert to an aluminium oxide matrix following heat treatment.

Aluminium chlorohydrate, a hydroxylated aluminium based sol containing a chloride counter ion, also known as aluminium chlorohydrol, has the general formula $$Al_mO_n(OH)_oCl_p\cdot x(H_2O)$$

wherein m is 1 to 20, n is 1 to 8, o is 5 to 40, p is 2 to 15, and x is 0 to 30. In one embodiment, the binder is $Al_{13}O_4(OH)_{24}Cl_7\cdot 12(H_2O)$ as is described in G. M. Wolterman, et al., *Stud. Surf. Sci. and Catal.*, 76, pages 105–144, Elsevier, Amsterdam, 1993, which is herein incorporated by reference. In another embodiment, one or more binders are present in combination with one or more other non-limiting examples of alumina materials such as aluminium oxyhydroxide, γ-alumina, boehmite and transitional aluminas such as α-alumina, β-alumina, γ-alumina, δ-alumina, ε-alumina, κ-alumina, and ρ-alumina, aluminium trihydroxide, such as gibbsite, bayerite, nordstrandite, doyelite, and mixtures thereof.

In another embodiment, the binders are alumina sols, predominantly comprising aluminum oxide, optionally including silicon. In yet another embodiment, the binders are peptised alumina made by treating alumina hydrates such as pseudobohemite, with an acid, preferably a non-halogen acid, to prepare sols or aluminium ion solutions. Non-limiting examples of commercially available colloidal alumina sols include Nalco 8676 available from Nalco Chemical Co., Naperville, Ill., and Nyacol available from the Nyacol Nano Technology Inc., Boston, Mass.

If binder is not used in making the molecular sieve catalyst, the catalyst is considered a binderless catalyst. If binder is used, the amount of binder used to prepare the molecular sieve catalyst ranges from about 2% by weight to about 30% by weight, based on the total weight of the binder, the molecular sieve, and optionally included matrix material, excluding the liquid (i.e., after drying). Preferably the amount of binder used to prepare the molecular sieve catalyst ranges from about 5% by weight to about 20% by weight, more preferably from about 7% by weight to about 15% by weight, based on the total weight of the binder, the molecular sieve, and optionally included matrix material, excluding the liquid (i.e., after drying).

Where the catalyst composition contains a binder and a matrix material, the weight ratio of the binder to the matrix material is typically from 1:15 to 1:5, such as from 1:10 to 1:4, and particularly from 1:6 to 1:5. The amount of binder is typically from about 2% by weight to about 30% by weight, such as from about 5% by weight to about 20% by weight, and particularly from about 7% by weight to about 15% by weight, based on the total weight of the binder, the molecular sieve and matrix material. It has been found that a higher sieve content and lower matrix content increases the molecular sieve catalyst composition performance, whereas a lower sieve content and higher matrix content improves the attrition resistance of the composition.

In general, the amount of binder and/or matrix material is such that the formulated molecular sieve catalyst composition contains from about 1% to about 99%, such as from about 10% to about 90%, such as from about 10% to about 80%, for example from about 20% to about 70%, and conveniently from about 25% to about 60% by weight of the molecular sieve, based on the total weight of the formulated molecular sieve catalyst composition.

The molecular sieve crystals are mixed with liquid, and the optional matrix material and/or binder, using conventional techniques to form a slurry. The components can be mixed in any order, and the mixture is thoroughly stirred to form the slurry. The more thorough the stirring, the better the consistency of the slurry.

In one embodiment, the slurry has a solids content of from about 10 wt % to about 75 wt %, based on total weight of the slurry. Preferably the slurry has a solids content of from about 15 wt % to about 70 wt %, more preferably from about 20 wt % to about 65 wt %, based on the total weight of the slurry. The solids content can be measured using any conventional means. However, a CEM MAS 700 microwave muffle furnace is particularly preferred to give results consistent with the values recited herein.

In another embodiment, the slurry used to make the formulated molecular sieve catalyst contains binder and matrix material at a weight ratio of from 0:1 to 1:1. Preferably, the slurry used to make the molecular sieve catalyst contains binder and matrix material at a weight ratio of from 1:15 to 1:2, more preferably 1:10 to 1:2, and most preferably 1:6 to 1:1. In cases where binders are not used, the molecular sieve component itself acts as a binder.

In formulating the catalyst composition, the molecular sieve and optional binder and/or matrix materials are initially combined in the presence of a liquid to form a slurry typically containing from about 20 weight percent to about 90 weight percent, such as from about 25 weight percent to about 85 weight percent, molecular sieve, based on total weight of the slurry. The liquid used to form the slurry can, for example, be one or a combination of water, an alcohol, a ketone, an aldehyde, and/or an ester, but normally will be water.

Liquid is removed from the slurry containing the molecular sieve crystals to form a preformed molecular sieve catalyst. Preferably, the slurry is fed to a forming unit that produces the preformed molecular sieve catalyst composition. The forming unit may be any conventional unit, such as a spray dryer, pelletizer, extruder, etc. In a preferred embodiment, the forming unit is spray dryer, which removes water from the slurry by a heating or drying process. Preferably, the forming unit is maintained at a temperature sufficient to remove a majority of the liquid from the slurry.

A spray dryer can be used as the forming (or drying) unit. Desirably, the slurry of the molecular sieve particles, and optional matrix material and/or binder, is fed to the spray drying unit along with a drying gas. The drying gas contacts the slurry and acts to remove water to form the preformed molecular sieve catalyst. Conventional drying conditions can be used. Such conditions include an average inlet temperature ranging from about 150° C. to about 550° C., and an average outlet temperature ranging from about 100° C. to about 250° C.

The molecular sieve material is activated by removing the template from the preformed molecular sieve catalyst composition so as to expose the active catalytic sites to the environment. The template can be removed by any conventional technique, including for example by elution methods or by heating. The molecular sieve crystals themselves can be activated for immediate catalytic use or for storing or transporting prior to use. However, it is preferred that the molecular sieves be formulated into a preformed catalyst, then activated, since the sieves are typically most useful as a formulated product. The formulated product generally provides the most effective particle size and hardness for commercial scale equipment.

In one embodiment of the invention, the molecular sieve material is activated by removing the template by heat. In a preferred embodiment, the heat is sufficient to remove water that is formed as a result of the combustion of the template. Preferably, the molecular sieve material is heated at a temperature greater than the critical temperature of water. At this temperature, water formed during the combustion process will not condense or be retained by the molecular sieve. Preferably, the template is removed by contacting with steam at a temperature greater than the critical temperature of water. More preferably, following removal of the template, any water entrained in the catalyst is also removed, preferably by appropriate heating using a dry gas. Preferably, the dry gas has a relative water pressure of less than 0.0001.

Heating to remove template and activate the molecular sieve is generally referred to in this invention as calcination. Conventional calcination devices can be used. Such devices include rotary calciners, fluid bed calciners, batch ovens, and the like. Calcination time is typically dependent on the degree of hardening of the molecular sieve catalyst composition and the temperature.

Conventional calcination temperatures are effective to remove template materials and to activate the molecular sieve catalyst of this invention. Such temperatures are generally in the range from about 400° C. to about 1,000° C., preferably from about 500° C. to about 800° C., and most preferably from about 550° C. to about 700° C.

III. Details of Operating Conditions of the Invention

A. General Overview

In this invention, the catalytic activity of molecular sieve catalyst particles is preserved by controlling the environment of molecular sieve catalyst particles that have coke on the surface. When a catalyst particle has coke on its surface, the temperature of the catalyst is maintained below the temperature of the oxygenate to olefin reactor. If the temperature is raised significantly above the reaction temperature of the oxygenate to olefin reaction, such as during regeneration of the catalyst, the coked catalyst should be heated in the presence of an atmosphere containing a gas phase oxygen source. Suitable gas phase oxygen sources include air and $H_2O$.

One example of controlling the environment of the molecular sieve catalyst is in the handling of molecular sieve catalyst after regeneration. During an oxygenate to olefin process, coke will accumulate on the formulated catalyst particles. It is desirable to retain some coke on the catalyst particles in order to control the selectivity of the catalyst. In one embodiment, this invention is employed when non-regenerated catalyst particles have a coke level of greater than 2% of the weight of molecular sieve material within the catalyst particles.

The coke level on the non-regenerated catalyst particles (or any other catalyst particles) represents an average value over all particles. As described above, as catalyst particles pass through the reactor, only a portion of the catalyst particles pass through the regenerator before returning to the fluidized bed of catalyst particles. Catalyst particles that pass through the regenerator will lose some or all of the coke that has accumulated on the particles. By contrast, catalyst particles that do not pass through the regenerator will retain any coke accumulated since the last pass through the regenerator. Thus, the coke level on an individual particles can vary widely, depending in part on how recently an individual particle has passed through the catalyst regenerator.

In this invention, the coke level on the catalyst particles is referred to as a weight percent relative to the weight of molecular sieve in the formulated catalyst. Thus, the coke level is expressed in comparison with the weight of the molecular sieve in the formulated catalyst, not the total weight of the formulated catalyst. In formulated catalyst, a substantial portion of the weight of the catalyst particle will be due to binder or matrix material. For example, one typical formulation produces catalyst particles that are roughly 60% by weight binder or matrix material and roughly 40% by weight molecular sieve. For such a formulated catalyst, a coke level of 2% by weight relative to the weight of molecular sieve corresponds to a catalyst particle having a coke level of 0.8% relative to the total weight of the formulated molecular sieve particle.

During regeneration, the catalyst particles are typically heated in the presence of oxygen to a temperature above the typical processing temperature for an oxygenate to olefin reaction. The regeneration temperature is preferably at least 550° C., more preferably at least 580° C., and still more preferably at least 600° C. The regeneration temperature is preferably not greater than 900° C., more preferably not greater than 850° C., and still more preferably not greater than 780° C. After regeneration, these particles are eventually mixed with other, non-regenerated particles that still have significant amounts of coke on their surface. When the regenerated catalyst particles are mixed with the coked catalyst particles, the regenerated particles can serve as a heat source. Environments that are relatively high in heat content and/or low in oxygen content can lead to catalyst degradation.

In one embodiment, catalyst degradation is significantly reduced or eliminated by cooling the regenerated catalyst particles prior to mixing with other particles that have coke on their surface. For example, the regenerated catalyst particles can be cooled to a temperature that is below the reactor temperature for the oxygenate to olefin reaction. In an embodiment, the regenerated catalyst particles are cooled to below about 550° C., preferably below 525° C., and more preferably below 500° C. In another embodiment, the regenerated catalyst particles are cooled to a temperature greater than 400° C., preferably greater than 425° C., and more preferably greater than 450° C.

Various techniques can be used to cool the regenerated catalyst particles as they leave the regenerator. For example, the regenerated particles can be passed through a catalyst cooler or other heat exchanger to reduce the temperature of the particles. The regenerated catalyst particles can also be mixed with a gas at a lower temperature, such as steam. Mixing the regenerated catalyst with steam has the added benefit of providing a gas phase oxygen source. In this embodiment, even if the regenerated catalyst particles are at a temperature above the mixing temperature when mixed with coked catalyst particles, catalyst breakdown will not occur.

B. Oxygenate Feedstock

The present invention is applicable to any reaction system for performing an olefin forming reaction in which feedstock is converted into one or more olefin(s). Typically, the feedstock contains one or more aliphatic-containing compounds such that the aliphatic moiety contains from 1 to about 50 carbon atoms, such as from 1 to 20 carbon atoms, for example from 1 to 10 carbon atoms, and particularly from 1 to 4 carbon atoms.

Non-limiting examples of aliphatic-containing compounds include alcohols such as methanol and ethanol, alkyl mercaptans such as methyl mercaptan and ethyl mercaptan, alkyl sulfides such as methyl sulfide, alkylamines such as methylamine, alkyl ethers such as dimethyl ether, diethyl ether and methylethyl ether, alkyl halides such as methyl chloride and ethyl chloride, alkyl ketones such as dimethyl ketone, formaldehydes, and various acids such as acetic acid.

In a preferred embodiment of the process of the invention, the feedstock contains one or more oxygenates, more specifically, one or more organic compound(s) containing at least one oxygen atom. In the most preferred embodiment of the process of invention, the oxygenate in the feedstock is one or more alcohol(s), preferably aliphatic alcohol(s) where the aliphatic moiety of the alcohol(s) has from 1 to 20 carbon atoms, preferably from 1 to 10 carbon atoms, and most preferably from 1 to 4 carbon atoms. The alcohols useful as feedstock in the process of the invention include lower straight and branched chain aliphatic alcohols and their unsaturated counterparts.

Non-limiting examples of oxygenates include methanol, ethanol, n-propanol, isopropanol, methyl ethyl ether, dimethyl ether, diethyl ether, di-isopropyl ether, formaldehyde, dimethyl carbonate, dimethyl ketone, acetic acid, acetaldehyde, and mixtures thereof.

In the most preferred embodiment, the feedstock is selected from one or more of methanol, ethanol, propanol, dimethyl ether, diethyl ether, acetaldehyde, or a combination thereof, more preferably methanol and dimethyl ether, and most preferably methanol.

The various feedstocks discussed above, particularly a feedstock containing an oxygenate, more particularly a feedstock containing an alcohol, is converted primarily into one or more olefin(s). The olefin(s) produced from the feedstock typically have from 2 to 30 carbon atoms, preferably 2 to 8 carbon atoms, more preferably 2 to 6 carbon atoms, still more preferably 2 to 4 carbons atoms, and most preferably are ethylene and/or propylene.

A particularly useful example of an oxygenate to olefin process is generally referred to as the gas-to-olefins (GTO) process or, alternatively, the methanol-to-olefins (MTO) process. In this process, an oxygenated feedstock, most preferably a methanol-containing feedstock, is converted in the presence of a molecular sieve catalyst composition into one or more olefin(s), preferably and predominantly, ethylene and/or propylene.

During a SAPO catalyst driven conversion of a feedstock, preferably a feedstock containing one or more oxygenates, the amount of olefin(s) produced based on the total weight of hydrocarbon produced is greater than 50 weight percent, typically greater than 60 weight percent, such as greater than 70 weight percent, and preferably greater than 75 weight percent. In one embodiment, the amount of ethylene and/or propylene produced based on the total weight of hydrocarbon product produced is greater than 65 weight percent, such as greater than 70 weight percent, for example greater than 75 weight percent, and preferably greater than 78 weight percent. Typically, the amount ethylene produced in weight percent based on the total weight of hydrocarbon product produced, is greater than 30 weight percent, such as greater than 35 weight percent, for example greater than 40 weight percent. In addition, the amount of propylene produced in weight percent based on the total weight of hydrocarbon product produced is greater than 20 weight percent, such as greater than 25 weight percent, for example greater than 30 weight percent, and preferably greater than 35 weight percent.

In addition to the oxygenate component, such as methanol, the feedstock may contains one or more diluent(s), which are generally non-reactive to the feedstock or molecular sieve catalyst composition and are typically used to reduce the concentration of the feedstock. Non-limiting examples of diluents include helium, argon, nitrogen, carbon monoxide, carbon dioxide, water, essentially non-reactive paraffins (especially alkanes such as methane, ethane, and propane), essentially non-reactive aromatic compounds, and mixtures thereof. The most preferred diluents are water and nitrogen, with water being particularly preferred.

The diluent, for example water, may be used either in a liquid or a vapor form, or a combination thereof. The diluent may be either added directly to the feedstock entering a reactor or added directly to the reactor, or added with the molecular sieve catalyst composition.

C. Reactor Types and Reaction Conditions

The oxygenate to olefin reactions of this invention can be conducted over a wide range of pressures including autogenous pressure. Typically the partial pressure of the feedstock exclusive of any diluent therein employed in the process is in the range of from about 0.1 kPaa to about 5 MPaa, such as from about 5 kPaa to about 1 MPaa, and conveniently from about 20 kPaa to about 500 kPaa.

The weight hourly space velocity (WHSV) within an oxygenate to olefin reactor, defined as the total weight of feedstock excluding any diluents per hour per weight of molecular sieve in the catalyst composition, typically ranges from about 1 $hr^{-1}$ to about 5000 $hr^{-1}$, such as from about 2 $hr^{-1}$ to about 3000 $hr^{-1}$, for example from about 5 $hr^{-1}$ to about 1500 $hr^{-1}$, and conveniently from about 10 $hr^{-1}$ to about 1000 $hr^{-1}$. In one embodiment, the WHSV is greater than 20 $hr^{-1}$ and, where feedstock contains methanol and/or dimethyl ether, is in the range of from about 20 $hr^{-1}$ to about 300 $hr^{-1}$.

Where the reaction is conducted in a fluidized bed, the superficial gas velocity (SGV) of the feedstock including diluent and reaction products within the reactor system, and particularly within a riser reactor(s), is at least 0.1 meter per second (m/sec), such as greater than 0.5 m/sec, such as greater than 1 m/sec, for example greater than 2 m/sec, conveniently greater than 3 m/sec, and typically greater than 4 m/sec. See for example U.S. patent application Ser. No. 09/708,753 filed Nov. 8, 2000, which is herein incorporated by reference.

The reaction of this invention is conveniently conducted as a fixed bed process, or more typically as a fluidized bed process (including a turbulent bed process), such as a continuous fluidized bed process, and particularly a continuous high velocity fluidized bed process.

The reaction can take place in a variety of catalytic reactors such as hybrid reactors that have a dense bed or fixed bed reaction zones and/or fast fluidized bed reaction zones coupled together, circulating fluidized bed reactors, riser reactors, and the like. Suitable conventional reactor types are described in for example U.S. Pat. No. 4,076,796, U.S. Pat. No. 6,287,522 (dual riser), and *Fluidization Engineering*, D. Kunii and O. Levenspiel, Robert E. Krieger Publishing Company, New York, N.Y. 1977, which are all herein fully incorporated by reference.

The preferred reactor types are riser reactors generally described in Riser Reactor, *Fluidization and Fluid-Particle Systems*, pages 48 to 59, F. A. Zenz and D. F. Othmo, Reinhold Publishing Corporation, New York, 1960, and U.S. Pat. No. 6,166,282 (fast-fluidized bed reactor), and U.S. patent application Ser. No. 09/564,613 filed May 4, 2000 (multiple riser reactor), which are all herein fully incorporated by reference.

In one practical embodiment, the process is conducted as a fluidized bed process or high velocity fluidized bed process utilizing a reactor system, a regeneration system and a recovery system.

In such a process the reactor system conveniently includes a fluid bed reactor system having a first reaction zone within one or more riser reactor(s) and a second reaction zone within at least one disengaging vessel, typically comprising one or more cyclones. In one embodiment, the one or more riser reactor(s) and disengaging vessel are contained within a single reactor vessel. Fresh feedstock, preferably containing one or more oxygenates, optionally with one or more diluent(s), is fed to the one or more riser reactor(s) into which a molecular sieve catalyst composition or coked version thereof is introduced. In one embodiment, prior to being introduced to the riser reactor(s), the molecular sieve catalyst composition or coked version thereof is contacted with a liquid, preferably water or methanol, and/or a gas, for example, an inert gas such as nitrogen.

In an embodiment, the amount of fresh feedstock fed as a liquid and/or a vapor to the reactor system is in the range of from 0.1 weight percent to about 99.9 weight percent, such as from about 1 weight percent to about 99 weight percent, more typically from about 5 weight percent to about 95 weight percent based on the total weight of the feedstock including any diluent contained therein. The liquid and vapor feedstocks may be the same composition, or may contain varying proportions of the same or different feedstocks with the same or different diluents.

The feedstock entering the reactor system is preferably converted, partially or fully, in the first reactor zone into a gaseous effluent that enters the disengaging vessel along with the coked catalyst composition. In the preferred embodiment, cyclone(s) are provided within the disengaging vessel to separate the coked catalyst composition from the gaseous effluent containing one or more olefin(s) within the disengaging vessel. Although cyclones are preferred, gravity effects within the disengaging vessel can also be used to separate the catalyst composition from the gaseous effluent.

Other methods for separating the catalyst composition from the gaseous effluent include the use of plates, caps, elbows, and the like.

In one embodiment, the disengaging vessel includes a stripping zone, typically in a lower portion of the disengaging vessel. In the stripping zone the coked catalyst composition is contacted with a gas, preferably one or a combination of steam, methane, carbon dioxide, carbon monoxide, hydrogen, or an inert gas such as argon, preferably steam, to recover adsorbed hydrocarbons from the coked catalyst composition that is then introduced to the regeneration system.

The coked catalyst composition is withdrawn from the disengaging vessel and introduced to the regeneration system. The regeneration system comprises a regenerator where the coked catalyst composition is contacted with a regeneration medium, preferably a gas containing oxygen, under conventional regeneration conditions of temperature, pressure and residence time.

Non-limiting examples of suitable regeneration media include one or more of oxygen, $O_3$, $SO_3$, $N_2O$, $NO$, $NO_2$, $N_2O_5$, air, air diluted with nitrogen or carbon dioxide, oxygen and water (U.S. Pat. No. 6,245,703), carbon monoxide and/or hydrogen. Suitable regeneration conditions are those capable of burning coke from the coked catalyst composition, preferably to a level less than 0.5 weight percent based on the total weight of the coked molecular sieve catalyst composition entering the regeneration system. For example, the regeneration temperature may be in the range of from about 200° C. to about 1500° C., such as from about 300° C. to about 1000° C., for example from about 450° C. to about 750° C., and conveniently from about 550° C. to 700° C. The regeneration pressure may be in the range of from about 15 psia (103 kPaa) to about 500 psia (3448 kPaa), such as from about 20 psia (138 kPaa) to about 250 psia (1724 kPaa), including from about 25 psia (172 kPaa) to about 150 psia (1034 kPaa), and conveniently from about 30 psia (207 kPaa) to about 60 psia (414 kPaa).

The residence time of the catalyst composition in the regenerator may be in the range of from about one minute to several hours, such as from about one minute to 100 minutes. In a preferred embodiment, the gas used to regenerate the coked catalyst contains a stoichiometric excess of oxygen relative to the amount of oxygen necessary to convert all coke to a volatile product, such as CO or $CO_2$. Desirably, the gas used to regenerate the coked catalyst will contain enough oxygen to produce a regeneration flue gas containing greater than 0.2 mole percent of oxygen, more desirably greater than 0.5 percent, and most desirably greater than 1 mole percent.

The burning of coke in the regeneration step is an exothermic reaction, and in an embodiment, the temperature within the regeneration system is controlled by various techniques in the art including feeding a cooled gas to the regenerator vessel, operated either in a batch, continuous, or semi-continuous mode, or a combination thereof. A preferred technique involves withdrawing the regenerated catalyst composition from the regeneration system and passing it through a catalyst cooler to form a cooled regenerated catalyst composition. The catalyst cooler, in an embodiment, is a heat exchanger that is located either internal or external to the regeneration system. Other methods for operating a regeneration system are in disclosed U.S. Pat. No. 6,290,916 (controlling moisture), which is herein fully incorporated by reference.

The regenerated catalyst composition withdrawn from the regeneration system, preferably from the catalyst cooler, is combined with a fresh molecular sieve catalyst composition and/or re-circulated molecular sieve catalyst composition and/or feedstock and/or fresh gas or liquids, and returned to the riser reactor(s). In one embodiment, the regenerated catalyst composition withdrawn from the regeneration system is returned to the riser reactor(s) directly, preferably after passing through a catalyst cooler. A carrier, such as an inert gas, feedstock vapor, steam or the like, may be used, semi-continuously or continuously, to facilitate the introduction of the regenerated catalyst composition to the reactor system, preferably to the one or more riser reactor(s). Alternatively, the regenerated catalyst particles can be mixed with a flow of non-regenerated, coked catalyst particles prior to introduction into the riser reactor(s). The relative amounts of catalyst particles in the flows of regenerated catalyst and coked catalyst will vary depending in part on the desired coke level in the reactor system.

Additional gases may be added to the regenerated catalyst particle flow or coked catalyst particle flow prior to mixing. Preferably, an oxygen-containing gas such as molecular oxygen, air, or steam is added to one of the flows, so that the regenerated catalyst particles and coked catalyst particles are mixed in an atmosphere containing an oxygen-containing gas.

By controlling the flow of the regenerated catalyst composition or cooled regenerated catalyst composition from the regeneration system to the reactor system, the optimum average level of coke on the molecular sieve catalyst composition entering the reactor is maintained. There are many techniques for controlling the flow of a catalyst composition described in Michael Louge, *Experimental Techniques, Circulating Fluidized Beds*, Grace, Avidan and Knowlton, eds., Blackie, 1997 (336–337), which is herein incorporated by reference.

Coke levels on the catalyst composition are measured by withdrawing the catalyst composition from the conversion process and determining its carbon content. Typical levels of coke on the molecular sieve catalyst composition are in the range of from 0.01 weight percent to about 21 weight percent based on the weight of the molecular sieve, such as from about 0.1 weight percent to about 10 weight percent, for example from about 0.2 weight percent to about 5 weight percent, and conveniently from about 0.3 weight percent to about 2 weight percent.

The gaseous effluent is withdrawn from the disengaging system and is passed through a recovery system. There are many well known recovery systems, techniques and sequences that are useful in separating olefin(s) and purifying olefin(s) from the gaseous effluent. Recovery systems generally comprise one or more or a combination of various separation, fractionation and/or distillation towers, columns, splitters, or trains, reaction systems such as ethylbenzene manufacture (U.S. Pat. No. 5,476,978) and other derivative processes such as aldehydes, ketones and ester manufacture (U.S. Pat. No. 5,675,041), and other associated equipment, for example various condensers, heat exchangers, refrigeration systems or chill trains, compressors, knock-out drums or pots, pumps, and the like.

Non-limiting examples of these towers, columns, splitters or trains used alone or in combination include one or more of a demethanizer, preferably a high temperature demethanizer, a deethanizer, a depropanizer, a wash tower often referred to as a caustic wash tower and/or quench tower, absorbers, adsorbers, membranes, ethylene (C2) splitter, propylene (C3) splitter and butene (C4) splitter.

Various recovery systems useful for recovering olefin(s), such as ethylene, propylene and/or butene, are described in U.S. Pat. No. 5,960,643 (secondary rich ethylene stream), U.S. Pat. Nos. 5,019,143, 5,452,581 and 5,082,481 (membrane separations), U.S. Pat. No. 5,672,197 (pressure dependent adsorbents), U.S. Pat. No. 6,069,288 (hydrogen removal), U.S. Pat. No. 5,904,880 (recovered methanol to hydrogen and carbon dioxide in one step), U.S. Pat. No. 5,927,063 (recovered methanol to gas turbine power plant), and U.S. Pat. No. 6,121,504 (direct product quench), U.S. Pat. No. 6,121,503 (high purity olefins without superfractionation), and U.S. Pat. No. 6,293,998 (pressure swing adsorption), which are all herein fully incorporated by reference.

Other recovery systems that include purification systems, for example for the purification of olefin(s), are described in *Kirk-Othmer Encyclopedia of Chemical Technology*, 4th Edition, Volume 9, John Wiley & Sons, 1996, pages 249–271 and 894–899, which is herein incorporated by reference. Purification systems are also described in for example, U.S. Pat. No. 6,271,428 (purification of a diolefin hydrocarbon stream), U.S. Pat. No. 6,293,999 (separating propylene from propane), and U.S. patent application Ser. No. 09/689,363 filed Oct. 20, 2000 (purge stream using hydrating catalyst), which are herein incorporated by reference.

Generally accompanying most recovery systems is the production, generation or accumulation of additional products, by-products and/or contaminants along with the preferred prime products. The preferred prime products, the light olefins, such as ethylene and propylene, are typically purified for use in derivative manufacturing processes such as polymerization processes. Therefore, in the most preferred embodiment of the recovery system, the recovery system also includes a purification system. For example, the light olefin(s) produced particularly in a MTO process are passed through a purification system that removes low levels of by-products or contaminants.

Non-limiting examples of contaminants and by-products include generally polar compounds such as water, alcohols, carboxylic acids, ethers, carbon oxides, sulfur compounds such as hydrogen sulfide, carbonyl sulfides and mercaptans, ammonia and other nitrogen compounds, arsine, phosphine and chlorides. Other contaminants or by-products include hydrogen and hydrocarbons such as acetylene, methyl acetylene, propadiene, butadiene and butyne.

Typically, in converting one or more oxygenates to olefin(s) having 2 or 3 carbon atoms, a minor amount hydrocarbons, particularly olefin(s), having 4 or more carbon atoms is also produced. The amount of C4+ hydrocarbons is normally less than 20 weight percent, such as less than 10 weight percent, for example less than 5 weight percent, and particularly less than 2 weight percent, based on the total weight of the effluent gas withdrawn from the process, excluding water. Typically, therefore the recovery system may include one or more reaction systems for converting the C4+ impurities to useful products.

Non-limiting examples of such reaction systems are described in U.S. Pat. No. 5,955,640 (converting a four carbon product into butene-1), U.S. Pat. No. 4,774,375 (isobutane and butene-2 oligomerized to an alkylate gasoline), U.S. Pat. No. 6,049,017 (dimerization of n-butylene), U.S. Pat. Nos. 4,287,369 and 5,763,678 (carbonylation or hydroformulation of higher olefins with carbon dioxide and hydrogen making carbonyl compounds), U.S. Pat. No. 4,542,252 (multistage adiabatic process), U.S. Pat. No. 5,634,354 (olefin-hydrogen recovery), and Cosyns, J. et al., *Process for Upgrading C3, C4 and C5 Olefinic Streams*, Pet. & Coal, Vol. 37, No. 4 (1995) (dimerizing or oligomerizing propylene, butylene and pentylene), which are all fully herein incorporated by reference.

The preferred light olefin(s) produced by any one of the processes described above are high purity prime olefin(s) products that contain a single carbon number olefin in an amount greater than 80 percent, such as greater than 90 weight percent, such as greater than 95 weight percent, for example at least about 99 weight percent, based on the total weight of the olefin.

IV. EXAMPLES

A. Reactivity Stabilization

Figure 1:
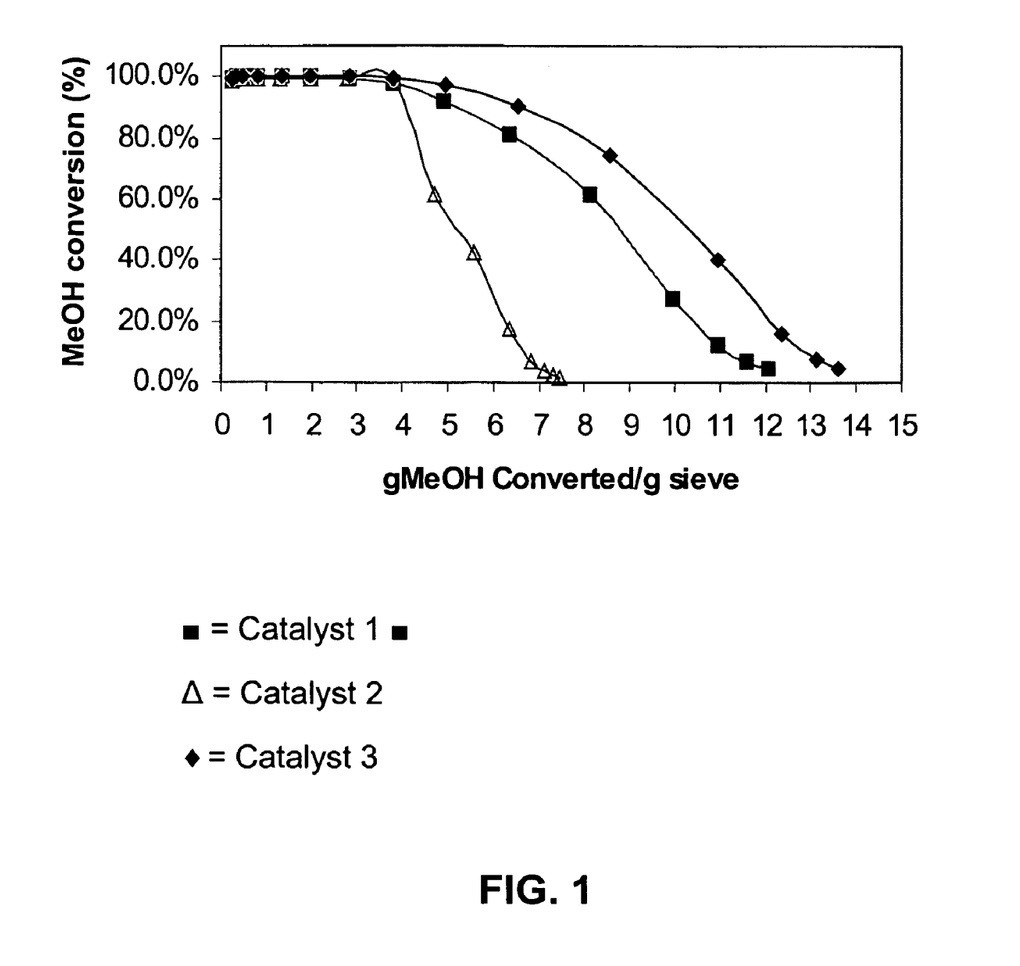
FIG. 1 depicts data on the conversion efficiency for molecular sieves that have been exposed to various process conditions.
Figure 2:
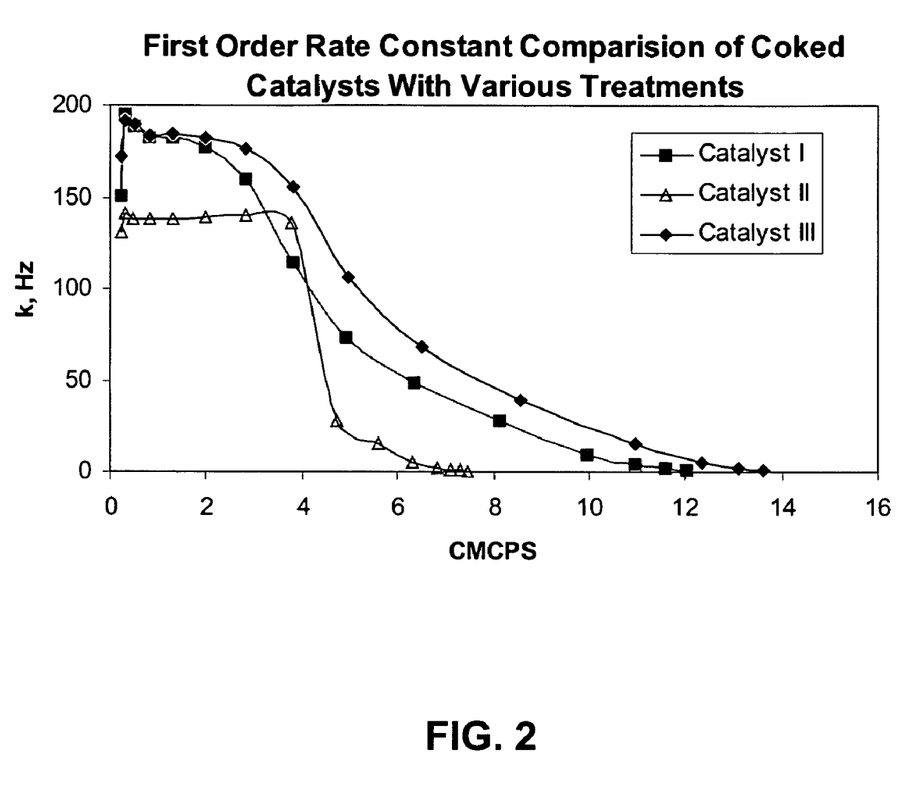
FIG. 2 shows the rate constant for the conversion reaction using the three different catalyst samples.

FIGS. 1–2 demonstrate the effects of allowing coked catalyst particles to become exposed to temperatures above 725° C. in an oxygen deficient environment. For the experiments in FIGS. 1–2, coked catalyst particles containing SAPO-34 molecular sieve and having coke on the surface were pretreated, or regenerated, under 3 different conditions. The initial coke amount was 18.3% by weight relative to the weight of molecular sieve within the catalyst particles. For the first sample, referred to as 'catalyst I', the coked catalyst particles were regenerated by calcining in air at 725° C. for 4 hours. In the second procedure (catalyst II), the coked catalyst particles were heated to 725° C. in dry $N_2$ for 4 hours. This results in only partial removal of the coke from the surface of the particles, as 14.5% by weight of coke remained after the procedure. This remaining coke was removed from the particles by calcining in air at 650° C. In the third procedure (catalyst III), the coked catalyst particles were heated to 725° C. in 8.3 psia of $H_2O/N_2$ for 4 hours. After these regeneration procedures, each of the formerly coked catalyst samples was placed in a test reactor to run a methanol to olefin conversion reaction. In the test reaction, 100 grams of MeOH per gram of sieve per hour was fed into the test reactor for conversion by the molecular sieve material.

FIG. 1 shows the Cumulative grams of Methanol Converted Per gram of Sieve (CMCPS) for the test reactions run with coked catalyst samples prepared under each regeneration procedure. The CMCPS plot shows the percentage of methanol that is converted into olefin as a function of how much methanol has been added to the reactor. The bottom scale is a relative scale showing the amount of methanol added in relation to the amount of sieve within the reactor.

Initially, all three catalyst samples convert 100% of the methanol introduced into the reactor. However, the plot for catalyst II shows a drop off in the conversion effectiveness much earlier than the molecular sieve particles treated with the other treatments. The catalyst II sample rapidly loses effectiveness after converting only 4 grams of MeOH per gram of catalyst. For example, by the time that 5 grams of methanol per gram of sieve have been converted using catalyst II, the conversion rate for methanol has dropped to below 50%. The catalyst II sample has completely lost all catalytic ability by the time roughly 7.5 grams of MeOH per gram of catalyst has been treated. The drop-off in conversion percentage for the other two catalyst preparations occurs later and is more gradual. For both the catalyst I and catalyst III samples, the methanol conversion percentage is above 90% at 5 grams of methanol per gram of sieve.

The CMCPS plot in FIG. 1 represents data for one type of formulated catalyst particles containing SAPO-34 molecular sieve. For other catalyst particle with different formulations or that contain another molecular sieve, the CMCPS behavior will be similar to that shown in FIG. 1, but the absolute values may vary. One way to compare behavior between different types and formulations of catalyst particles is to define an effective lifetime for the catalyst particles. The CMCPS value at which non-deactivated catalyst particles convert only 50% of available methanol can be used as a definition of lifetime for the catalyst particles. For example, the Catalyst I and Catalyst III preparations represent catalyst that has been protected according to this invention. In FIG. 1, these catalyst particles maintain at least a 50% conversion rate up to a CMCPS value of roughly 10. More generally, formulated catalyst particles will have catalyst lifetimes ranging from 1 to 50, depending on the formulation and type of molecular sieve.

Use of this invention allows the activity of catalyst particles to be maintained at greater than 80% conversion at half of the catalyst lifetime for that catalyst particle. Preferably, this invention maintains the activity of catalyst particles at greater than 90% conversion at half of the catalyst lifetime CMCPS. For example, in FIG. 1 the catalyst particles protected using the present invention maintain an activity of greater than 90% at a CMCPS value of 5, which is approximately half of the catalyst lifetime.

The catalyst II sample also exhibits reduced selectivity for the production of ethylene and propylene. This is sometimes referred to as 'prime olefin' selectivity. The average prime olefin selectivity (POS) represents the average weight percent of ethylene and propylene produced out of all products formed during the conversion reaction. The average POS for the catalyst I sample was 72.7 wt. %. The average POS for the catalyst III sample was 73.0 wt. %. By contrast, the average POS value for the catalyst II sample was 69.9 wt. %. Thus, the catalyst II sample exhibits greater than a 2 wt % drop in selectivity for formation of the desired prime olefins.

For many reactor configurations, it is unlikely that all of the particles within a reactor will be exposed to conditions capable of producing catalyst deactivation at the same time. The conditions for deactivation may only affect a small portion of the particles within the reactor at any one time. In this situation, the results of the CPCMS test would be an average based on the percentage of undamaged and deactivated catalyst within the catalyst sample. In an embodiment, the presence of deactivated catalyst within the catalyst sample would be identified based on a sample having less than a 80% conversion percentage at 5 grams of methanol per gram of sieve. In another embodiment, the presence of deactivated catalyst within the catalyst sample would be identified by having less than an 90% conversion percentage at 5 grams of methanol per gram of sieve. In still another embodiment, the presence of deactivated catalyst within the catalyst sample would be identified based on a sample having an average POS value of less than 72.0 wt %. In yet another embodiment, the presence of deactivated catalyst within the catalyst sample would be identified based on the average POS value for the sample being reduced by 1% or more relative to a catalyst sample containing no deactivated catalyst. Because of the large volumes of feedstock converted during an industrial scale reaction, even a 1% change in prime olefin selectivity represents a significant change in the amount of prime olefin produced.

FIG. 2 provides another indication of the change in catalyst performance when coked catalyst is exposed to excessive heat when a source of oxygen such as steam is not available. FIG. 2 shows the rate constant for the conversion reaction using the three different catalyst samples. Once again, the results for catalyst samples I and III are similar, while the catalyst II sample shows a degradation in performance. The initial reaction rate constant for the catalyst II sample is roughly 140 while the reaction rate constant for the catalyst I and III samples is 170 or higher. During the conversion reaction, the catalyst II sample exhibits a sharp drop in the reaction rate after roughly 4 grams of MeOH per gram of catalyst have been processed. For catalyst samples I and III, the drop in reaction rate constant is much more gradual, with both samples I and III still showing catalyzing some reaction after conversion of 10 grams of MeOH per gram of catalyst.

B. Temperature Dependency

In another experiment, coked catalyst particles were placed in a recycle-loop reactor to investigate thermal reactions and coke oxidation of the coked catalyst particles in a helium environment. This is a recirculating, batch reactor. The internal volume of the loop is 76.4 cc, with a recirculation rate of 200 cc/min and a total pressure of 1.5 bar. The catalyst charge is 50 mg of coked catalyst particles containing roughly 18.3% coke by weight relative to the weight of molecular sieve in the catalyst particles. The catalyst is contained in a ¼" outer diameter by 12" long quartz u-tube reactor. The u-tube was heated to reaction temperatures between 450° C. and 750° C., but the remainder of the recycle loop is maintained at ambient temperature. Products were detected by micro-gas chromatography analysis performed at 2 minute intervals. This technique permitted the tracking of various products, including CO, $CO_2$, $H_2O$, $O_2$, and other hydrocarbons and oxygenates. In this experiment, the coke contained in the catalyst particles is the only source of carbon in the reactor. Similarly, the only source of oxygen within the reactor is any oxygen contained within the catalyst particles.

At 450° C. and 550° C., the primary products from heating the coked catalyst were hydrocarbons, such as methane and ethylene. This is believed to represent outgassing from the coke. CO and $CO_2$ were produced in small quantities, constituting less than 10% of the carbon containing products. After 50 minutes, the total carbon content of the CO and $CO_2$ produced in the reactor represented only 0.5% of the total available carbon content (coke on the surface) of the catalyst particles. The production of CO and $CO_2$ indicates that a reaction of some type is occurring on the catalyst surface. Without being bound by a particular theory, it is believed that this reaction contributes to the degradation of catalyst reactivity.

At 650° C., the amount of hydrocarbons produced in the reactor increased slightly due to the production of additional methane. However, significantly higher levels of CO and $CO_2$ were produced. After 50 minutes, the total carbon content of CO and $CO_2$ produced in the reactor represented more than 3% of the available carbon content of the catalyst particles. This quantity also represented roughly 20% to 25% of the carbon containing products.

At 750° C., the total amount of hydrocarbons produced was similar to the amount at 650° C. This increase in temperature did not result in production of additional volatile hydrocarbon products. However, the amount of CO and $CO_2$ produced in the reactor increased considerably. After 50 minutes, the total amount of CO and $CO_2$ produced represented roughly 8% of the available carbon content of the catalyst particles.

The above experiments demonstrate a significant change in the types of carbon products produced as the temperature is varied. At temperatures below 550° C., the dominant products are hydrocarbons with little production of CO or $CO_2$. As the temperature is increased, the production of hydrocarbons remains relatively constant, while the production of CO and $CO_2$ steadily increases.

Those skilled in the art will recognize that the above embodiments are merely illustrative, and that variations on the above description may be made while staying within the scope of the present invention.

We claim:

1. A process for protecting catalytic activity of a silicoalumino-phosphate molecular sieve, comprising the steps of:
   a) regenerating silicoaluminophosphate molecular sieve catalyst particles to contain less than about 1% coke by weight relative to a weight of molecular sieve material within the regenerated catalyst particles at a temperature of at least 580° C.;
   b) cooling the regenerated catalyst particles to a temperature of from 400° C. to 550° C.; and
   c) mixing the regenerated catalyst particles at a temperature of less than 550° C. with coked catalyst particles containing at least 2% coke by weight relative to a weight of molecular sieve material within the coked catalyst particles to maintain the catalytic activity of the mixed catalyst particles at a predetermined level,
   wherein during the mixing of the regenerated catalyst particles with the coked catalyst particles, carbon contained in the coke is the only carbon present and oxygen contained within the catalyst is the only oxygen present.

2. The process of claim 1, wherein the regenerated catalyst particles are regenerated in a regenerator that is part of a reactor system for converting oxygenates to olefins.

3. The process of claim 2, wherein the regenerated catalyst particles are mixed with coked catalyst particles in a fluidized bed within a reactor.

4. The process of claim 2, wherein the regenerated catalyst particles are mixed with coked catalyst particles prior to introducing the regenerated catalyst particles into a fluidized bed within a reactor.

5. The process of claim 1, wherein the coked catalyst particles contain from about 2% to about 18% coke by weight relative to the weight of molecular sieve material within the coked catalyst particles.

6. The process of claim 1, wherein the coked catalyst particles contain from about 7% to about 13% coke by weight relative to a weight of molecular sieve material within the coked catalyst particles.

7. The process of claim 1, wherein the regenerated catalyst particles contain less than 0.2% coke by weight relative to a weight of molecular sieve material within the regenerated catalyst particles.

8. The process of claim 1, wherein a lifetime of the mixed catalyst particles corresponds to a cumulative grams of methanol converted per gram of sieve value of about 10, and wherein a catalytic activity of the mixed catalyst particles is maintained at above 80% conversion of methanol to olefin at a cumulative grams of methanol convened per grain of sieve value of 5.

9. The process of claim 1, wherein a lifetime of the mixed catalyst particles corresponds to a cumulative grams of methanol converted per gram of sieve value of about 10, and wherein a catalytic activity of the mixed catalyst particles is maintained at above 90% conversion of methanol to olefin at a cumulative grams of methanol convened per gram of sieve value of 5.

10. The process of claim 1, wherein a catalytic activity of the mixed catalyst particles is maintained at above 80% conversion of methanol to olefin at a cumulative grams of methanol convened per gram of sieve value corresponding to half of a catalyst particle lifetime.

11. The process of claim 1, wherein a lifetime of the mixed catalyst particles corresponds to a cumulative grams of methanol convened per gram of sieve value from about 20 to 30, and wherein a catalytic activity of the mixed catalyst particles is maintained at above 80% conversion of methanol to olefin at a cumulative grams of methanol convened per gram of sieve value from about 10 to 15.

12. The process of claim 1, wherein a lifetime of the mixed catalyst particles corresponds to a cumulative grams of methanol convened per gram of sieve value from about 40 to 50, and wherein a catalytic activity of the mixed catalyst particles is maintained at above 80% conversion of methanol to olefin at a cumulative grams of methanol converted per gram of sieve value from about 20 to 25.

13. The process of claim 1, wherein a selectivity of the mixed catalyst particles is maintained at above an average prime olefin selectivity value of 72.0%.

14. The process of claim 1, wherein a selectivity of the mixed catalyst particles is maintained within 1% of an average prime olefin selectivity value for a sample of catalyst particles that does not contain deactivated catalyst.

15. The process of claim 1, wherein the regenerated catalyst particles are mixed with the coked catalyst particles at a mass flow rate that is at least 5% of the mass flow rate of the coked catalyst particles.

16. The process of claim 1, wherein the regenerated catalyst particles arc mixed with the coked catalyst particles at a mass flow rate that is from about 20% to 100% of the mass flow rate of the coked catalyst particles at mixing.

17. The process of claim 1, wherein the regenerated catalyst particles are mixed with the coked catalyst particles at a mass flow rate that is from about 30% to 50% of the mass flow rate of the coked catalyst particles at mixing.

18. A process for protecting catalytic activity of a silicoalumino-phosphate molecular sieve, comprising the steps of:
   a) regenerating catalyst particles that contain silicoaluminophosphate molecular sieve at a temperature of at least 580° C.;
   b) cooling the regenerated catalyst particles after regeneration to a temperature of 550° C. or less; and
   c) mixing the cooled, regenerated catalyst particles with coked catalyst particles having a coke level of at least 2% by weight relative to a weight of molecular sieve material within the coked catalyst particles to maintain a catalytic activity of the coked catalyst particles at above 80% conversion of methanol at a cumulative grams of methanol convened per gram of sieve value of 5,
   wherein during the mixing of the regenerated catalyst particles with the coked catalyst particles, carbon contained in the coke is the only carbon present and oxygen contained within the catalyst is the only oxygen present.

19. The process of claim 18, wherein the regenerated catalyst particles are mixed at a temperature from about 400° C. to about 550° C.

20. The process of claim 18, wherein the coked catalyst particles contain from about 2% to about 18% coke by weight relative to the weight of molecular sieve material within the coked catalyst particles.

21. The process of claim 18, wherein the coked catalyst particles contain from about 7% to about 13% coke by weight relative to a weight of molecular sieve material within the coked catalyst particles.

22. The process of claim 18, wherein the regenerated catalyst particles contain less than 0.2% coke by weight relative to a weight of molecular sieve material within the regenerated catalyst particles.

23. The process of claim 18, wherein the regenerated catalyst particles are mixed with the coked catalyst particles at a mass flow rate that is at least 5% of a mass flow rate of the coked catalyst particles.

24. The process of claim 18, wherein the regenerated catalyst particles are mixed with the caked catalyst particles at a mass flow rate that is from about 20% to 100% of a mass flow rate of the coked catalyst particles at mixing.

25. The process of claim 18, wherein the regenerated catalyst particles are mixed with the coked catalyst particles at a mass flow rate that is from about 30% to 50% of a mass flow rate of the coked catalyst particles at mixing.

26. A process for protecting catalytic activity of a silicoalumino-phosphate molecular sieve, comprising the steps of:
   a) regenerating silicoaluminophosphate molecular sieve catalyst particles at a temperature of at least 580° C. to contain less than about 1% coke by weight relative to a weight of molecular sieve material within the regenerated catalyst particles in a regenerator containing a stoichiometric excess of oxygen;
   b) cooling the regenerated catalyst particles to a temperature of less than 550° C.; and
   c) mixing the cooled, regenerated catalyst particles with coked catalyst particles containing at least 2% coke by weight relative to a weight of molecular sieve material within the coked catalyst particles to maintain the catalytic activity of the mixed catalyst particles at a predetermined level,
   wherein during the mixing of the regenerated catalyst particles with the coked catalyst particles, carbon contained in the coke is the only carbon present and oxygen contained within the catalyst is the only oxygen present.

27. The process of claim 26, wherein the regenerated catalyst particles are mixed at a temperature front about 400° C. to about 550° C.

28. The process of claim 26, wherein the coked catalyst particles contain from about 2% to about 18% coke by weight relative to the weight of molecular sieve material within the coked catalyst particles.

29. The process of claim 26, wherein the coked catalyst particles contain from about 7% to about 13% coke by weight relative to a weight of molecular sieve material within the coked catalyst particles.

30. The process of claim 26, wherein the regenerated catalyst particles contain less than 0.2% coke by weight relative to a weight of molecular sieve material within the regenerated catalyst particles.

31. The process of claim 26, wherein the regenerated catalyst particles are mixed with the coked catalyst particles at a mass flow rate that is at least 5% of the mass flow rate of the coked catalyst particles.

32. The process of claim 26, wherein the regenerated catalyst particles are mixed with the coked catalyst particles at a mass flaw rate that is from about 20% to 100% of the mass flow rate of the coked catalyst particles at mixing.

33. The process of claim 26, wherein the regenerated catalyst particles are mixed with the coked catalyst particles at a mass flow rate that is from about 30% to 50% of the mass flow rate of the coked catalyst particles at mixing.

* * * * *